US010662369B2

(12) United States Patent
Socci et al.

(10) Patent No.: US 10,662,369 B2
(45) Date of Patent: May 26, 2020

(54) SOLVENT SYSTEMS HAVING A HIGH FLASH POINT AND METHODS OF USE THEREOF

(71) Applicant: ETHICAL SOLUTIONS, LLC, South Windsor, CT (US)

(72) Inventors: Daniel J. Socci, West Hartford, CT (US); Jennifer L. Holcomb, Torrington, CT (US)

(73) Assignee: Ehtical Solutions, LLC, South Windsor, CT (US)

(*) Notice: Subject to any disclaimer, the term of this patent is extended or adjusted under 35 U.S.C. 154(b) by 0 days.

(21) Appl. No.: 15/365,999

(22) Filed: Dec. 1, 2016

(65) Prior Publication Data
US 2017/0166801 A1 Jun. 15, 2017

Related U.S. Application Data

(60) Provisional application No. 62/266,367, filed on Dec. 11, 2015.

(51) Int. Cl.
| E21B 37/06 | (2006.01) |
| C09K 8/524 | (2006.01) |
| C09K 8/035 | (2006.01) |
| C09K 8/60 | (2006.01) |
| C09K 8/86 | (2006.01) |
| C09K 8/62 | (2006.01) |
| C09K 8/58 | (2006.01) |
| C09K 8/40 | (2006.01) |
| C09K 8/52 | (2006.01) |
| C09K 8/528 | (2006.01) |
| C09K 8/532 | (2006.01) |
| E21B 21/00 | (2006.01) |
| E21B 43/26 | (2006.01) |
| E21B 43/267 | (2006.01) |

(52) U.S. Cl.
CPC .............. C09K 8/524 (2013.01); C09K 8/035 (2013.01); C09K 8/40 (2013.01); C09K 8/52 (2013.01); C09K 8/528 (2013.01); C09K 8/532 (2013.01); C09K 8/58 (2013.01); C09K 8/60 (2013.01); C09K 8/601 (2013.01); C09K 8/62 (2013.01); C09K 8/86 (2013.01); E21B 21/00 (2013.01); E21B 37/06 (2013.01); E21B 43/26 (2013.01); C09K 2208/20 (2013.01); E21B 43/267 (2013.01)

(58) Field of Classification Search
None
See application file for complete search history.

(56) References Cited

U.S. PATENT DOCUMENTS

| 5,720,825 | A | 2/1998 | Kinnaird | |
| 6,096,699 | A | 8/2000 | Bergemann et al. | |
| 6,281,189 | B1 | 8/2001 | Heimann et al. | |
| 7,231,976 | B2 | 6/2007 | Berry et al. | |
| 7,392,844 | B2 | 7/2008 | Berry et al. | |
| 7,893,010 | B2 | 2/2011 | Ali et al. | |
| 8,414,797 | B2 | 4/2013 | Howard et al. | |
| 2002/0132740 | A1* | 9/2002 | Von Krosigk | C09K 8/52 507/200 |
| 2004/0087449 | A1* | 5/2004 | Furman | C09K 8/524 507/200 |
| 2006/0096757 | A1 | 5/2006 | Berry et al. | |
| 2006/0096758 | A1* | 5/2006 | Berry | C09K 8/40 166/291 |
| 2013/0133694 | A1 | 5/2013 | Zaki et al. | |
| 2013/0137611 | A1* | 5/2013 | Pierce | C09K 8/52 507/260 |

FOREIGN PATENT DOCUMENTS

WO 9712947 A1 4/1997

OTHER PUBLICATIONS

Extended European search report for EP application No. 16203273.4, dated May 22, 2017, 8 pages.

* cited by examiner

Primary Examiner — Andrew Sue-Ako
(74) Attorney, Agent, or Firm — Ohlandt, Greeley, Ruggiero & Perle, L.L.P.

(57) ABSTRACT

A method and composition of treating an oil or gas well having a wellbore, well casing, production equipment or recovery equipment. The method involves introducing into the wellbore, well casing, production equipment or recovery equipment a high flash point solvent blend. The blend includes at least one $C_1$-$C_4$ ester of a $C_{16}$-$C_{20}$ fatty acid component, at least one terpene hydrocarbon component (e.g., a pure gum turpentine, an oil of turpentine, or mixture thereof), and optionally at least one emulsifier component. The weight percent ratio of the at least one $C_1$-$C_4$ ester of a $C_{16}$-$C_{20}$ fatty acid component to the at least one terpene hydrocarbon component is from about 60:40 weight percent to about 95:5 weight percent, based on the total weight of the blend. The blend has a flash point greater than about 140° F. The blend may be biodegradable, and has no ozone depleting compounds, no hazardous air pollutants, and no carcinogens.

23 Claims, No Drawings

SOLVENT SYSTEMS HAVING A HIGH FLASH POINT AND METHODS OF USE THEREOF

RELATED APPLICATION

This application claims the benefit of U.S. Provisional Application Ser. No. 62/266,367, filed on Dec. 11, 2015, which is incorporated herein by reference in its entirety.

BACKGROUND OF THE DISCLOSURE

1. Field of the Disclosure

The present disclosure relates to solvent systems (e.g., a fatty acid ester and a terpene) having a high flash point (e.g., above about 140° F.). The present disclosure also relates to a method of treating an oil or gas well with the high flash point solvent systems. The high flash point solvent systems are biodegradable, and have no ozone depleting compounds, no hazardous air pollutants, and no carcinogens.

2. Description of the Related Art

Stimulation refers to the treatment of geological formations to improve the recovery of hydrocarbons. Common stimulation techniques include well fracturing and acidizing operations.

Fracturing of the formation is accomplished by pumping fluids into the borehole of an oil or gas well under high pressure to create fractures in the rock formation surrounding the wellbore. The fractures radiate outwardly from the wellbore, typically from a few to hundreds of meters, and extend the surface area from which oil or gas drains into the well.

Typically, the fracturing fluid is a crosslinked polymer that has been gelled to increase its viscosity. Crosslinked gels are able to withstand the high temperature conditions commonly found in deeper oil and gas wells with little reduction in viscosity. After the fracturing fluid is injected into the formation to produce the fracture, the viscosity of the fluid is reduced by gel breakers. Such components break down the gelled fluid so that it can be easily pumped and removed from the well. Often, breaker catalysts are used to activate the gel breaker.

In certain formations, aqueous acid solutions can be used to improve the permeability of the formation, thereby increasing production. These acids are often combined with the polymer gels used in fracturing to provide an acid fracturing fluid. One of the benefits of combining the aqueous acid solutions with gelled fracturing fluids is that the gelled fluid inhibits or retards the reaction of the acid with the formation. This is beneficial in that the acid would otherwise react too quickly, depleting the acid with very little penetration of the formation. Once in place, the viscosity of the fluid is reduced so that the acid is released to react with formation damage or other skin present at the face of the newly formed fractures and improving the permeability of the producing strata.

In addition to fracturing and acidizing operations, stimulation further encompasses techniques for enhancing oil recovery as well as water control treatments. In the latter, the flow of excess water is prevented while the flow of produced hydrocarbons from the well is enhanced.

Stimulation methods often include the use of spearhead fluids that are typically composed of an aqueous base fluid and chemical additives. Spearhead fluids precede the introduction of stimulation fluids. The spearhead fluid removes heavy oil deposits in the near wellbore and oil films in the pore spaces of the rock.

In contrast to stimulation, remediation refers to the removal of unwanted deposits from the wellbore and production equipment. Remediation includes hydrogen sulfide mitigation. Such unwanted deposits form and/or accumulate in the wellbore, production and recovery equipment and well casing. For example, highly toxic hydrogen sulfide is produced during the decomposition of organic matter. In addition to hydrogen sulfide, other undesirable downhole products form such as scale, paraffins, fines, pipe dope, sulfur, heavy oil tar by-products and water blocks. Such accumulated deposits affect productivity and are typically removed prior to cementing or the introduction of completion fluids into the wellbore. Remediation treatment fluids are further typically used to remove such undesired deposits prior to the introduction of stimulation fluids.

Upon the completion of drilling and cementing operations, it is often desired to displace the drilling fluid system with a completion fluid system. Completion often requires the use of a packer fluid in the annulus between the casing and the production tubing. Well completion designs and reservoir conditions govern acceptable levels of particle content in packer fluids. The required cleanliness of this fluid can vary from several hundred Nephelometric Turbidity Units (NTU) down to 10-20 NTU.

Displacement of a drilling fluid with a completion fluid may be performed in several steps. Typically, the drilling fluid is first displaced by a casing cleaning fluid. Treatment with seawater normally follows. The seawater may then be displaced by a packer fluid. Complete displacement of a fluid by another fluid by use of hydraulic force is difficult to achieve in the annulus. In order to more efficiently displace the drilling fluid with a packer fluid, cleaning fluids with a variety of chemical additives are pumped between the drilling fluid and the packer fluid. The chemical additives serve to disperse and break-up solid components within the drilling fluid. In addition, they serve to decrease surface activity between the two fluids.

Formulators of well treatment products using volatile organic compounds (VOCs) are challenged to use and obtain the required VOC combinations for use in their products, to comply with toxic emissions, and to provide for safety in manufacturing, shipping, storage, and ultimate use. VOCs are hazardous both physically (flammable) as well as chemically (carcinogens). Many VOCs used for well treatment are known carcinogens, for example xylene and toluene. VOCs are classified in part based upon their flash points. The flash point of the VOC becomes a critical factor for emission discharge and safety, because it is the point at which the liquid becomes a volatile vapor, mixes with oxygen, and thereby acquires its most combustible or flammable state. Flash point, as used herein, refers to the lowest temperature at which a volatile liquid can vaporize to form an ignitable mixture in air. In the United States, the Environmental Protection Agency (EPA) and the Department of Transportation (DOT) have classified such compounds based on their volatilities or "flash points".

The current EPA and DOT VOC classifications are as follows: Class I liquids (flammable) have a flash point at or below 100° F.; Class II liquids (combustible) have a flash point from 100° F. to below 140° F.; and Class III liquids (combustible) have a flash point above 140° F. to below 200° F.

For well treatment products using VOCs, their uses may be regulated by many countries' governmental agencies.

The more hazardous a well treatment product, the more restrictions exist on its use. Further, formulators of well treatment products using VOCs must handle the more flammable products more carefully and have to address issues involving atmospheric volatility and worker health concerns due to excessive exposure to these chemicals. If these well treatment fluids can be modified so that their flash points can be increased, this would result in significantly more uses for these fluids as well as increasing their shelf lives. It is desirable therefore to increase the flash point of a variety of well treatment fluids without substantially increasing the cost of the fluid while maintaining the fluid and its utility and effectiveness for its purpose.

Well treatment fluids presently used for stimulation and remediation as well as fluids for removing drilling muds from the wellbore, prior to cementing or introduction of a completion brine, are either not biodegradable or are less efficacious than desired (e.g., volatile organic compounds (VOCs) and low flash points). There is a continued need for more effective and safer methods and systems for drilling fluid displacement, enhancement of oil recovery, wellbore remediation and formation stimulation. In particular, there is a need for new systems that are biodegradable, safe, low VOCs, and high flash points.

SUMMARY OF THE DISCLOSURE

The present disclosure relates to solvent systems (e.g., a fatty acid ester and a terpene) having a high flash point (e.g., above about 140° F.). The present disclosure also relates to a method of treating an oil or gas well with the high flash point solvent systems. The high flash point solvent systems are biodegradable, and have no ozone depleting compounds, no hazardous air pollutants, and no carcinogens.

The present disclosure provides improved efficiency in well remediation and stimulation by the introduction of a biodegradable solvent system into the wellbore. The solvent system has applicability in the removal of pipe dope and hydrocarbons, oil based, and synthetic oil based drilling muds and the dispersement of paraffins and asphaltenes. It may further be used as a displacement spacer system, either as a single spacer or as a multiple spacer in conjunction with a second fluid, for the removal of oil/synthetic oil based mud cake and hydrocarbons prior to cementing or prior to introduction of a completion brine.

The present disclosure provides, in addition, a solvent system that is useful as a spearhead fluid for the removal of unwanted deposits or hydrocarbons prior to the introduction of a stimulation (or other well treatment) fluid.

Further, the present disclosure provides a solvent system that is of assistance in water control and as a breaker catalyst to decrease the viscosity of fracturing fluids and other gelled well treatment fluids upon lowering of the pH. Alternatively, the solvent system may function with enzyme breakers. As the pH of the solvent system is decreased, the enzymes are activated which causes a decrease in viscosity of the fracturing fluids or other gelled well treatment fluids.

The present disclosure provides a plant-based solvent system that is further useful in the displacement of synthetic and oil based drilling mud systems from the annulus and casing.

The present disclosure provides a method of treating an oil or gas well having a wellbore, well casing, production equipment or recovery equipment. The method comprises introducing into the wellbore, well casing, production equipment or recovery equipment a high flash point solvent blend. The blend comprises at least one $C_1$-$C_4$ ester of a $C_{16}$-$C_{20}$ fatty acid component and at least one terpene hydrocarbon component (e.g., a pure gum turpentine, an oil of turpentine, or mixture thereof). The weight percent ratio of the at least one $C_1$-$C_4$ ester of a $C_{16}$-$C_{20}$ fatty acid component to the at least one terpene hydrocarbon component is from about 60:40 weight percent to about 95:5 weight percent, based on the total weight of the blend. The blend has a flash point greater than about 140° F.

The present disclosure also provides a method of treating an oil or gas well having a wellbore, well casing, production equipment or recovery equipment. The method comprises introducing into the wellbore, well casing, production equipment or recovery equipment a blend, which when mixed with water, forms a microemulsion. The blend comprises a blend of at least one $C_1$-$C_4$ ester of a $C_{16}$-$C_{20}$ fatty acid component, at least one terpene hydrocarbon component (e.g., a pure gum turpentine, an oil of turpentine, or mixture thereof), and at least one emulsifier component. The weight percent ratio of the at least one $C_1$-$C_4$ ester of a $C_{16}$-$C_{20}$ fatty acid component to the at least one terpene hydrocarbon component is from about 60:40 weight percent to about 95:5 weight percent, based on the total weight of the blend. The blend has a flash point greater than about 140° F.

The present disclosure further provides a method of removing pipe dope, hydrocarbons, drilling muds, hydrogen sulfide, scales, fines, sulfur, heaving oil byproducts, water blocks, cement filtrates, kill fluids, paraffins and/or asphaltenes from surface equipment or downhole equipment. The method comprises introducing onto the surface of the surface equipment or downhole equipment a high flash point solvent blend. The blend comprises at least one $C_1$-$C_4$ ester of a $C_{16}$-$C_{20}$ fatty acid component and at least one terpene hydrocarbon component (e.g., a pure gum turpentine, an oil of turpentine, or mixture thereof). The weight percent ratio of the at least one $C_1$-$C_4$ ester of a $C_{16}$-$C_{20}$ fatty acid component to the at least one terpene hydrocarbon component is from about 60:40 weight percent to about 95:5 weight percent, based on the total weight of the blend. The blend has a flash point greater than about 140° F.

The present disclosure yet further provides method of method of removing pipe dope, hydrocarbons, drilling muds, hydrogen sulfide, scales, fines, sulfur, heaving oil byproducts, water blocks, cement filtrates, kill fluids, paraffins and/or asphaltenes from surface equipment or downhole equipment. The method comprises introducing onto the surface of the surface equipment or downhole equipment a blend which when mixed with water, forms a microemulsion. The blend comprises at least one $C_1$-$C_4$ ester of a $C_{16}$-$C_{20}$ fatty acid component, at least one terpene hydrocarbon component (e.g., a pure gum turpentine, an oil of turpentine, or mixture thereof), and at least one emulsifier component. The weight percent ratio of the at least one $C_1$-$C_4$ ester of a $C_{16}$-$C_{20}$ fatty acid component to the at least one terpene hydrocarbon component is from about 60:40 weight percent to about 95:5 weight percent, based on the total weight of the blend. The blend has a flash point greater than about 140° F.

The present disclosure also provides a composition comprising a blend of at least one $C_1$-$C_4$ ester of a $C_{16}$-$C_{20}$ fatty acid component, and at least one terpene hydrocarbon component (e.g., a pure gum turpentine, an oil of turpentine, or mixture thereof). The weight percent ratio of the at least one $C_1$-$C_4$ ester of a $C_{16}$-$C_{20}$ fatty acid component to the at least one terpene hydrocarbon component is from about 60:40 weight percent to about 95:5 weight percent, based on the total weight of the composition. The composition has a flash point greater than about 140° F.

The present disclosure further provides a composition comprising a blend of at least one $C_1$-$C_4$ ester of a $C_{16}$-$C_{20}$ fatty acid component, at least one terpene hydrocarbon component (e.g., a pure gum turpentine, an oil of turpentine, or mixture thereof), and at least one emulsifier component. The weight percent ratio of the at least one $C_1$-$C_4$ ester of a $C_{16}$-$C_{20}$ fatty acid component to the at least one terpene hydrocarbon component is from about 60:40 weight percent to about 95:5 weight percent, based on the total weight of the composition. The composition has a flash point greater than about 140° F. The blend, when mixed with water, forms a microemulsion.

The present disclosure yet further provides a composition for treating an oil or gas well having a wellbore, well casing, production equipment or recovery equipment. The composition comprises a blend of at least one $C_1$-$C_4$ ester of a $C_{16}$-$C_{20}$ fatty acid component and at least one terpene hydrocarbon component (e.g., a pure gum turpentine, an oil of turpentine, or mixture thereof). The weight percent ratio of the at least one $C_1$-$C_4$ ester of a $C_{16}$-$C_{20}$ fatty acid component to the at least one terpene hydrocarbon component is from about 60:40 weight percent to about 95:5 weight percent, based on the total weight of the composition. The composition has a flash point greater than about 140° F.

The present disclosure also provides a composition for treating an oil or gas well having a wellbore, well casing, production equipment or recovery equipment. The composition comprises a blend of at least one $C_1$-$C_4$ ester of a $C_{16}$-$C_{20}$ fatty acid component, at least one terpene hydrocarbon component (e.g., a pure gum turpentine, an oil of turpentine, or mixture thereof), and at least one emulsifier component. The weight percent ratio of the at least one $C_1$-$C_4$ ester of a $C_{16}$-$C_{20}$ fatty acid component to the at least one terpene hydrocarbon component is from about 60:40 weight percent to about 95:5 weight percent, based on the total weight of the composition. The composition has a flash point greater than about 140° F. The blend, when mixed with water, forms a microemulsion.

The present disclosure further provides a composition for removing pipe dope, hydrocarbons, drilling muds, hydrogen sulfide, scales, fines, sulfur, heaving oil byproducts, water blocks, cement filtrates, kill fluids, paraffins and/or asphaltenes from surface equipment or downhole equipment. The composition comprises a blend of at least one $C_1$-$C_4$ ester of a $C_{16}$-$C_{20}$ fatty acid component and at least one terpene hydrocarbon component (e.g., a pure gum turpentine, an oil of turpentine, or mixture thereof). The weight percent ratio of the at least one $C_1$-$C_4$ ester of a $C_{16}$-$C_{20}$ fatty acid component to the at least one terpene hydrocarbon component is from about 60:40 weight percent to about 95:5 weight percent, based on the total weight of the composition. The composition has a flash point greater than about 140° F.

The present disclosure yet further provides a composition removing pipe dope, hydrocarbons, drilling muds, hydrogen sulfide, scales, fines, sulfur, heaving oil byproducts, water blocks, cement filtrates, kill fluids, paraffins and/or asphaltenes from surface equipment or downhole equipment. The composition comprises a blend of at least one $C_1$-$C_4$ ester of a $C_{16}$-$C_{20}$ fatty acid component, at least one terpene hydrocarbon component (e.g., a pure gum turpentine, an oil of turpentine, or mixture thereof), and at least one emulsifier component. The weight percent ratio of the at least one $C_1$-$C_4$ ester of a $C_{16}$-$C_{20}$ fatty acid component to the at least one terpene hydrocarbon component is from about 60:40 weight percent to about 95:5 weight percent, based on the total weight of the composition. The composition has a flash point greater than about 140° F. The blend, when mixed with water, forms a microemulsion.

The compositions and methods of this disclosure provide for increased flow, production, and/or recovery of oil and gas hydrocarbons from a subterranean formation.

These and other systems, methods, objects, features, and advantages of the present disclosure will be apparent to those skilled in the art from the following detailed description of the preferred embodiment and the drawings.

DESCRIPTION OF THE EMBODIMENTS

Embodiments of the present disclosure are described more fully hereinafter with reference to the accompanying drawings, in which some, but not all, embodiments of the present disclosure are shown. Indeed, the present disclosure can be embodied in many different forms and should not be construed as limited to the embodiments set forth herein. Rather, these exemplary embodiments are provided so that the present disclosure satisfies applicable legal requirements. Also, like numbers refer to like elements throughout.

The solvent system of this disclosure displaces synthetic and oil based drilling mud systems from the annulus and casing as well as increases the production of hydrocarbons from oil and gas wells by managing undesirable downhole products encountered during the production of hydrocarbons from such reservoirs. The solvent systems of this disclosure exhibit high flash points, generally in excess of 140° F. In addition, the solvent systems of this disclosure have low volatile organic compounds (VOCs) and may exhibit very low aquatic toxicity. Thus, the solvent systems of this disclosure are especially useful in environmentally sensitive areas as well as in areas where a high flash point is necessary.

The system contains a fatty acid ester component, a terpene hydrocarbon component, and optionally a surfactant component. When the system contains a surfactant (e.g., one or more emulsifiers), the system can be combined with water to form an oil-in-water microemulsion. The microemulsion may phase separate if left undisturbed, however will easily re-emulsify upon little agitation.

Suitable fatty acid esters are those $C_1$-$C_4$ esters of $C_{16}$-$C_{20}$ fatty acids including edible vegetable oils. Such oils may have a melting point of –10° C. or less. Preferred edible vegetable oils are selected from corn, coconut, mustard, palm kernel oil, neem, niger seed, olive, peanut, poppy seed, safflower, rapeseed, sesame, soybean, sunflower seed, wheat germ oil and other polyunsaturated containing oils (such as oleic acid, linoleic acid, erucic acid and linolenic acid).

The $C_{16}$-$C_{20}$ fatty acid ester may further be a mixture of oils. Edible vegetable oils containing a mixture of about 70 to about 90 weight percent oleic and linoleic acids are often preferred. Soybean oil, which is comprised principally of oleic and linoleic acids, is a preferred $C_{16}$-$C_{20}$ fatty acid. A methyl ester is the preferred $C_1$-$C_4$ group. A particularly fatty acid ester is soybean methyl ester or soy methyl ester. Soy methyl ester is obtained from the esterification of soybean oil. Such fatty acid esters are non-toxic and biodegradable.

In some embodiments, the fatty acid ester concentration in the composition when introduced into the wellbore or subterranean formation may be between about 60 and about 99 percent by weight. The concentration is measured by dividing the weight of the total fatty acid ester by the total weight of the composition. The concentration may be greater than about 60, 65, 70, 75, 80, 85, 90 or 95 percent by weight.

The fatty acid ester component is combined with a terpene hydrocarbon component. Terpenes are a large and varied class of hydrocarbons with the molecular formula $(C_5H_8)_n$ and are produced by a wide variety of plants and trees, such as conifers and pines. Terpenes are derived biosynthetically from units of isoprene, which has the molecular formula $C_5H_8$. The term "terpene" is sometimes used broadly to also include the terpenoids which are terpenes that have been chemically changed or modified, such as through oxidation. A terpene, as used herein, may be any hydrocarbon, natural or synthetic, formed from isoprene units. Terpenes as well as terpenoids, are the primary ingredients of the essential oils of many types of trees, plants, and flowers, including citrus fruits. Terpenes are the major components of rosin (resin) as well as turpentine produced from gum rosin (resin).

The terpenes are generally classified sequentially by the number of isoprene units they contain as hemiterpenes (one isoprene unit), monoterpenes (two isoprene units), sesquiterpenes (three isoprene units), diterpenes (four isoprene units), sesterterpenes (five isoprene units), triterpenes (six isoprene units), and tetraterpenes (eight isoprene units).

When a terpene is modified chemically, such as by oxidation or rearrangement of the carbon skeleton, the resulting compound is generally referred to as a terpenoid. Terpenes and terpenoids are typically derived from plants, trees, flowers, and other vegetation. They come in the form of liquids, solids, waxes, oils, and alcohols. Terpenes and terpenoids may be formed as acyclic, monocyclic, or polycyclic structures. Sometimes alternatively referred to as "isoprenoids", terpenoids are derived from five-carbon isoprene units and can be classified as "modified terpenes", where methyl groups have been moved or removed, or oxygen atoms added. Some researchers use the term terpene to include all terpenoids.

Terpenes and terpenoids in various forms have been used for centuries in fragrances due to their compatibility with other compounds and their minimal negative environmental impact. Terpineol, a terpene alcohol, has the chemical formula: $C_{10}H_{18}O$ and is found in three isomeric forms, alpha, beta, and gamma, with beta-terpineol being non-naturally occurring. Terpenes and terpenoids have been used for other purposes, such as disinfectants, cleaning compounds, soaps, cosmetics, and colognes. They are also known to add, enhance, or mask the odor of products which might be offensive to humans or animals.

The term "terpene" is derived from the word "turpentine". Turpentine is a volatile fluid which is distilled and refined for further commercial uses. The most common terpenes obtained from rosin (resin) distillation are the bicyclic terpenes alpha-pinene (α-pinene), beta-pinene (β-pinene), delta-3 carene (δ-3 carene), and sabinene, the monocyclic terpenes limonene and terpinolene, and smaller amounts of tricyclic sesquiterpenes longifolene, caryophyllene, and delta-cadinene. Rubber, which is a polyterpene, is one of the most widely known terpenes.

As with other plant essential oils, terpenes are major constituents of the essential oils of citrus fruits. However, they are removed before the essential oil is used for flavoring beverages and foods because they tend to produce undesirable tastes when permitted to oxidize and polymerize.

Terpene hydrocarbons are liquid distillates separated from rosin pitch or sap from conifers, pine trees, citrus, and varied vegetation. The volatile terpene hydrocarbons, Chemical Abstracts Service Number (CAS #) 8006-64-2, are non-oxygenated with the molecular formula $C_{10}H_{16}$. Common names include terpenes, diterpenes, pure gum turpentine (PGT), oil of turpentine (OT), and limonene.

Pure gum turpentine is a complex formulation made of α-pinene (CAS #80-56-8) 40%-55% weight, β-pinene (CAS #127-91-3) 25%-35% weight, and the balance mixed trace terpenes. Pure gum turpentine is 99.5%-100% volatile, evaporating slightly less (0.9) than the reference standard (butyl acetate (1.0)) and has a flash point of 95° F., a boiling point of 155-180° C., and a Kauri-butanol (Kb) value greater than 50 and is generally soluble in organic solvents.

Turpentine, which is also known as spirit turpentine, oil of turpentine, and wood turpentine, is obtained by the distillation of resin from trees, usually pine trees. Turpentine prepared in this manner includes mostly alpha-pinene and beta-pinene, two terpene isomers. The exact composition of turpentine may vary from batch to batch depending on the distillation conditions and the resin source.

Terpene alcohols generally have the structure of terpenes except that they include at least one hydroxyl group. A terpene alcohol, as used herein, may be any compound, natural or synthetic, formed from isoprene units and having at least one hydroxyl group. Terpene alcohols are also derived from plants, trees, flowers, and other vegetation which allows their classification as "green compounds". Terpene alcohols are also divided into groups determined by the number of carbon atoms and repeating isoprene units. Terpene alcohols may be formed as acyclic, monocyclic, or polycyclic structures. Terpineol, a terpene alcohol, has the chemical formula: $C_{10}H_{18}O$ and is found in three isomeric forms, alpha (α), beta (β), and gamma (γ), with β-terpineol being non-naturally occurring. Terpene alcohols have been used for many purposes, including, but not limited to, disinfectants, cleaning compounds, soaps, cosmetics, and colognes. They are also known to add to, enhance, or mask the odor of products which might be otherwise offensive to humans or animals.

The compositions of the present disclosure include at least one terpene hydrocarbon component. In some embodiments, the compositions further include at least one terpene alcohol. The terpene is used to raise the flash point in compositions of the present disclosure. In some embodiments, a lesser amount of the terpene is required to raise the flash point of the compositions to the same temperature. A terpene, as used herein, may be any hydrocarbon, natural or synthetic, formed from isoprene units.

The terpene is preferably a monoterpene formed from two isoprene units and having the molecular formula $C_{10}H_{16}$. Monoterpenes include, but are not limited to, D-limonene, L-limonene, dipentene, terpinolene, alpha-ocimene, beta-ocimene, myrcene, alpha-terpinene, beta-terpinene, gamma-terpinene, sabinene, alpha-thujene, beta-thujene, camphene, carene, alpha-pinene, and beta-pinene.

More preferably, the terpene hydrocarbon component is turpentine or a component of turpentine. Turpentine, as used herein, may be any distilled resin from trees, usually pine trees. Turpentine may include at least camphene, carene, alpha-pinene, and beta-pinene in varying proportions depending on the resin source and distillation process. Gum turpentine, as used herein, is generally obtained by the distillation of sap from living pine trees, and preferably steam-distilled from *Pinus elliottii* trees. Gum turpentine preferably includes over 90% pinene, almost half of which being beta-pinene. Wood turpentine, in contrast, is generally obtained by distillation or solvent extraction from finely chopped wood chips and generally contains 75 to 85% alpha-pinene and little or no beta-pinene.

In some embodiments, the compositions also include at least one terpenoid. Terpenoids include, but are not limited to, terpene alcohols, citral, menthol, and camphor. Terpenoids generally have a vapor pressure that is less than 0.05 mm Hg, thus complying with VOC standards. Terpene alcohols include, but are not limited to, alpha terpineol, beta terpineol, gamma terpineol, geraniol, citronellol, nerol, nerolidol, and farnesol.

In some embodiments, the compositions contain about 0.5 to about 5 percent by total weight of the mixture (wt %) of at least one terpene hydrocarbon component. In some embodiments, the compositions contain about 0.5 wt % of at least one terpene and about 0.5 wt % of a terpene alcohol. In some embodiments, the terpene is turpentine. In some embodiments, the terpene alcohol is alpha terpineol.

A composition of the present disclosure preferably includes not greater than about 40 wt % of at least one terpene, and greater than about 60 wt % of a fatty acid ester such that the flash point of the system is above 140° F. In some embodiments, the terpene is selected from gum turpentine, dipentene, terpinolene, limonene, alpha-pinene, beta-pinene, and any combination of these. In some embodiments, the fatty acid ester is selected from vegetable oils including corn, coconut, mustard, palm kernel oil, neem, niger seed, olive, peanut, poppy seed, safflower, rapeseed, sesame, soybean, sunflower seed, wheat germ oil and other polyunsaturated containing oils (such as oleic acid, linoleic acid, erucic acid and linolenic acid). The terpene may also improve the performance, economic gain, or the solvent efficiency of the solvent system. In some embodiments, the terpene is present in a concentration less than 40 wt % and may be as low as about 0.25 wt % in some embodiments.

The compositions may be any terpene system known in the art to which at least one fatty acid ester has been added to raise the flash point. Preferably, the fatty acid ester raises the flash point of the system to above 140° F. More preferably, the fatty acid ester raises the flash point of the system to above 150° F. to meet most international standards for non-flammables. More preferably, a minimum amount of fatty acid ester is used to raise the flash point to about 140° F. to 200° F. The amount of fatty acid ester is preferably in the range of greater than about 60 wt %.

The weight percent ratio of the at least one $C_1$-$C_4$ ester of a $C_{16}$-$C_{20}$ fatty acid component to the at least one terpene hydrocarbon component is from about 60:40 weight percent to about 95:5 weight percent, preferably from about 65:35 weight percent to about 90:10 weight percent, and more preferably from about 70:30 weight percent to about 85:15 weight percent, based on the total weight of the composition.

If the weight percent of the at least one $C_1$-$C_4$ ester of a $C_{16}$-$C_{20}$ fatty acid component is less than about 60 weight percent, or if the weight percent of the at least one terpene hydrocarbon component is greater than about 40 weight percent, based on the total weight of the composition, then the compositions of this disclosure will not exhibit a high flash point above about 140° F. Thus, in accordance with this disclosure, it is important that the weight percent of the at least one $C_1$-$C_4$ ester of a $C_{16}$-$C_{20}$ fatty acid component be not less than about 60 weight percent, and the weight percent of the at least one terpene hydrocarbon component be not greater than about 40 weight percent, based on the total weight of the composition.

The fatty acid ester may further be combined with a lactate ester. The resulting blend may be used in conjunction with the terpene hydrocarbon component. The lactic acid ester is preferably a $C_1$-$C_4$ ester of lactic acid. Exemplary $C_1$-$C_4$ alcohols for producing the lactic acid ester include methanol, ethanol, propanol, isopropanol, allyl alcohol, butanol, 3-buten-1-ol, t-butanol and sec-butanol. Such alcohols are further the preferred alcohols for producing the fatty acid esters. In a particularly preferred embodiment, the lactic acid ester is ethyl lactate. Ethyl lactate is the ester of natural lactic acid produced by fermentation of corn-derived feedstock. Like the fatty acid esters, lactic acid esters are 100% biodegradable, breaking down into carbon dioxide and water, non-toxic, and renewable.

When present, the lactic acid ester is present at about 20 to about 75 weight percent and the fatty acid ester at about 10 to about 80 weight percent of the blend. In still other embodiments, the two esters are each present at about 40 to about 60 weight percent of the composition. In a preferred embodiment, the weight ratio of lactic acid ester:fatty acid ester is between from about 35:65 to 65:35, preferably 50:50.

A surfactant can optionally be included in the compositions of this disclosure. The surfactant can be, for example, a nonionic surfactant selected from a fatty alcohol ethoxylate, a fatty acid ethoxylate, a fatty acid ester, a fatty acid methyl ester ethoxylate, an alkyl polyglucoside, a polyalcohol ethoxylate, a soy alkyltrimethyl ammonium chloride, a monococoate, and combinations. The nonionic surfactant can be an ethoxylated coco fatty acid, an ethoxylated coco fatty ester, an ethoxylated cocoamide, an ethoxylated castor oil, a monococoate, and combinations. The polyethylene glycol (PEG) coco fatty acids can have a range of 5 to 40 PEG groups. The Hydrophile-Lipophile Balance (HLB) range for the PEG coco fatty acid can be 10 to 19. The concentration range of this compound can be from 0.01 to 80 percent of the total surfactant in this composition. The ethoxylated plant oil-based surfactants consisting of a PEG castor oil can have a range of 2.5 to 40 PEG groups. The Hydrophile-Lipophile Balance (HLB) range for the PEG castor oil can be 2.1 to 16. The concentration range of this compound can be from 10 to 80 percent of the total surfactant in this composition. The PEG cocamide can have a range of 2 to 20 PEG groups. The Hydrophile-Lipophile Balance (HLB) range for the PEG cocamide can be 2 to 19. The concentration range of this compound can be from 10 to 80 percent of the total surfactant in this composition. The sorbitan ester based surfactants can have the following: sorbitan monooleate with an HLB of 4.8: sorbitan monolaurate with an HLB of 8.6; sorbitan monopalmitate with an HLB of 6.5; and sorbitan monostearate with an HLB of 4.7. The ethoxylated sorbitan ester based surfactants can have the following: polyoxyethylene (20) sorbitan monooleate with an HLB of 15; polyoxyethylene(20) sorbitan monopalmitate with an HLB of 15.6; polyoxyethylene(20) sorbitan monostearate with an HLB of 14.9; and polyoxyethylene (20) sorbitan monooleate with an HLB of 15.0. The surfactant can be present in a final concentration as applied to the wellbore or subterranean formation that varies from 0.01 to 50 percent, for example, from 0.05 to 5 percent by weight.

In an embodiment, the surfactant can be, for example, a nonionic surfactant selected from a fatty alcohol ethoxylate, a fatty acid ethoxylate, a fatty acid ester, a fatty acid methyl ester ethoxylate, an alkyl polyglucoside, a polyalcohol ethoxylate, a soy alkyltrimethyl ammonium chloride, a monococoate, and combinations thereof.

In another embodiment, the surfactant can be, for example, a nonionic surfactant selected from an ethoxylated coco fatty acid, an ethoxylated coco fatty ester, an ethoxylated cocoamide, an ethoxylated castor oil, a monococoate, and combinations thereof.

In a further embodiment, the surfactant can be, for example, the ethoxylated coco fatty acid can be a polyethylene glycol (PEG) coco fatty acid having a range of about 5 to about 40 PEG groups, and a Hydrophile-Lipophile Balance (HLB) range from about 10 to about 19; the ethoxylated castor oil can be a polyethylene glycol (PEG) castor oil having a range of about 2.5 to about 40 PEG groups, and a Hydrophile-Lipophile Balance (HLB) range from about 2.1 to about 16; the ethoxylated cocoamide can be a polyethylene glycol (PEG) cocoamide having a range of about 2 to about 20 PEG groups, and a Hydrophile-Lipophile Balance (HLB) range from about 2 to about 19.

In a yet further embodiment, the surfactant can be, for example, the surfactant can be a sorbitan ester selected from sorbitan monooleate having a Hydrophile-Lipophile Balance (HLB) range from about 2.8 to about 8.8; sorbitan monolaurate having a Hydrophile-Lipophile Balance (HLB) range from about 4.6 to about 12.6; sorbitan monopalmitate having a Hydrophile-Lipophile Balance (HLB) range from about 2.5 to about 10.5; and sorbitan monostearate having a Hydrophile-Lipophile Balance (HLB) range from about 2.7 to about 8.7.

In another embodiment, the surfactant can be, for example, the surfactant can be an ethoxylated sorbitan ester selected from a polyethylene glycol (PEG) sorbitan monooleate having a range of about 2 to about 40 PEG groups, and having a Hydrophile-Lipophile Balance (HLB) range from about 10 to about 20; a polyethylene glycol (PEG) sorbitan monolaurate having a range of about 2 to about 40 PEG groups, and having a Hydrophile-Lipophile Balance (HLB) range from about 10 to about 20; a polyethylene glycol (PEG) sorbitan monopalmitate having a range of about 2 to about 40 PEG groups, and having a Hydrophile-Lipophile Balance (HLB) range from about 10 to about 20; and a polyethylene glycol (PEG) sorbitan monostearate having a range of about 2 to about 40 PEG groups, and having a Hydrophile-Lipophile Balance (HLB) range from about 10 to about 20.

In some embodiments, the surfactant concentration in the composition when introduced into the wellbore or subterranean formation may be between about 0.01 and about 50 percent by weight. The concentration is measured by dividing the weight of the total surfactant by the total weight of the composition. The concentration may be greater than about 0.01, 0.03, 0.05, 0.1, 0.5, or 1 by weight or less than about 50, 45, 40, 35, 30, 25, 20, 15, 10, or 5 percent by weight. Relative to the non-water components, the surfactant concentration may be greater than about 5, 10, 15, 20, 25, or 30 percent or less than about 95%, 90%, 85%, or 80%. The concentration relative to the non-water components is determined by dividing the weight of surfactant by the total weight of the non-water components in the composition.

The solvent system may further contain thixotropic agents and pH adjusters, when needed. For instance, the solvent systems may contain between 0 to about 10 weight percent of thickener. Preferred thixotropic agents are polysaccharide derivatives having nonionic functionalities such as alkyl alcohol or ether groups. Exemplary thickeners include methylcellulose, hydroxyethyl cellulose, hydroxypropyl cellulose, hydroxypropyl methylcellulose, cornstarch, hydroxyethyl cornstarch, and hydroxypropyl cornstarch.

The solvent system may be a homogeneous liquid or gel at 0° C. It may further have a flash point in excess of 140° F., preferably in excess of 150° F.

The solvent system can also be used as a concentrate, and as such, it can be admixed with up to about 30 weight percent water prior to use. The solvent system may further be emulsified prior to use.

In particular, the solvent system used in the disclosure may be in the form of a microemulsion, defined as a multiphase system consisting of water, co-solvent blend, emulsifier(s), and alcohol, and is a transparent and thermodynamically stable liquid solution. Microemulsions can be considered as small-scale versions of emulsions, i.e., droplet type dispersions either of oil-in-water with an average particulate size ranges in the order of about 5 to about 50 nm in drop radius. In emulsions, the average drop size grows continuously with time so that phase separation ultimately occurs. The drops of the emulsion are generally large (>0.1 microns) and often exhibit a milky or cloudy, rather than a translucent, appearance as seen in microemulsions.

The emulsifying agent lowers the interfacial tension between oil and water to produce a sufficiently small droplet size, from about 3 microns to about 20 microns, preferably about 10 microns or less in diameter. The emulsifier should be capable of creating an oil-in-water microemulsion upon combination with an appropriate quantity of water. Preferred emulsifiers are biodegradable and have an HLB (hydrophile-lipophile balance) value between from about 8 to about 18.

When employed, such emulsifiers may be present in the produced emulsion at a concentration in the range of about 200 ppm to about 10,000 ppm.

The emulsifiers can be anionic, nonionic, amphoteric, as well as mixtures thereof. Blends of both non-ionic and anionic emulsifiers have been found to decrease droplet size in most instances. Where such a blend is used, a preferred ratio of non-ionic to anionic emulsifier is about 5/95 to about 95/5, preferably about 50/50 to about 85/15.

Any suitable, non-toxic anionic emulsifier may be used in such blends. Preferred anionic emulsifiers include, but are not necessarily limited to those selected from alkyl sulfates, alkane sulfonates, alkyl aryl sulfonates and phosphate esters comprising about 8 to about 18 carbon atoms, preferably about 8 to about 12 carbon atoms.

Suitable anionic emulsifiers include the sodium alkyl benzene sulfonates sulfosuccinic acid esters such as sodium dioctyl sulfosuccinate, and the like. Preferred is dioctyl sulfosuccinate having an HLB value greater than about 13.

Suitable nonionic emulsifiers are those based on fatty alcohols. For instance, a preferred nonionic emulsifier is of the fatty alcohol ethoxylate type such as one having 6-mole ethoxylation on a 12-carbon alcohol. An example of a particularly suitable fatty alcohol ethoxylate is tallow alcohol ethoxylate containing 2 or 3 moles of ethylene oxide.

Further suitable as the nonionic emulsifiers are alkyl and alkylaryl polyether alcohols such as linear or branched polyoxyethylene alcohols, more preferably linear polyoxyethylene alcohols, comprising (a) from about 8 to about 30, preferably about 8 to about 20, carbon atoms, and (b) comprising about 3 to about 50 moles, most preferably about 3 to about 20 moles, ethylene oxide. Most preferred nonionic emulsifiers are linear polyoxyethylene alcohols having from about 13 to about 15 carbon atoms and comprising about 10 moles ethylene oxide. Further, preferred emulsifiers include nonylphenol ethoxylate having a HLB value of about 16 and comprising 20 ethylene oxide units per molecule, octylphenol ethoxylate having an HLB value greater than 13.5, and nonylphenol ethoxylate having a HLB value greater than 13.

In another preferred embodiment, the nonionic emulsifiers are a combination of alkylaryl ethoxylate and a polyethylene glycol (PEG) ester of fatty acids. Preferably, the alkylaryl ethoxylate is octyl, nonyl or dodecylphenol with 3 to 13 moles of ethylene oxide, while the PEG ester is of molecular weight range 200-600 with either one or two moles of unsaturated fatty acids.

Further preferred as oil-in-water emulsifiers are polyoxyethylene sorbitan monopalmitate, polyoxyethylene sorbitan monostearate, polyoxyethylene sorbitan monooleate, linear alcohol alkoxylates, alkyl ether sulfates, linear nonyl-phenols, dioxane, ethylene glycol and ethoxylated castor oils such as polyethylene glycol castor oil, dipalmitoylphosphatidylcholine (DPPC), polyoxyethylene (8.6) nonyl phenyl ether, ethylene oxide sulfonates (i.e., alkyl propoxy-ethoxysulfonate), alkyl propoxy-ethoxysulfate, alkylarylpropoxy-ethoxysulfonate and highly substituted benzene sulfonates.

Illustrative amphoteric emulsifiers suitable for present purposes are polyethoxyline amine and oxyethylated sodium salts.

While the emulsifiers outlined above cover a wide range of physical properties and provide wide ranging emulsification abilities, a balance between two quite different emulsifiers can produce a far greater effect than an intermediate emulsifier. For instance, especially desired results can be obtained by use of a fatty alcohol and dioctyl sodium sulfosuccinate.

The microemulsions may further contain a sufficient amount of a relatively strong acid to lower the pH of the solvent system to about 4 or less, preferably to about 2 or less to about 3 or less, and most preferably to about 1 or less. Relatively strong acids include, but are not necessarily limited to, phosphoric acid, hydrochloric acid, sulfuric acid, nitric acid, and the like. A preferred acid is phosphoric acid.

The alcohol component of the microemulsion serves as a coupling agent between the fatty acid ester/terpene blend and the emulsifier, thereby stabilizing the microemulsion. The alcohol also lowers the freezing point of the well treatment microemulsion. Although isopropanol is presently preferred, alternative suitable alcohols include mid-range primary, secondary and tertiary alcohols with between 1 and 20 carbon atoms, such as t-butanol, n-butanol, n-pentanol, n-hexanol and 2-ethyl-hexanol. Other freeze prevention additives can additionally or alternatively be added, such as detergent range alcohols ethoxylate, ethylene glycols (EG), polyethylene glycols (PEG), propylene glycols (PG) and triethylene glycols (TEG), with triethylene glycol being presently preferred.

The microemulsion preferably comprises from 0 wt % to about 15 wt % strong acid; about 10 wt % to about 70 wt %, preferably about 65 wt % emulsifier(s); from about 10 to about 50 wt % of fatty acid ester/terpene blend; from about 25 to about 45 wt. % alcohol and, the remainder, water. The microemulsion may further optionally include a salt.

The addition of a salt to the solvent system reduces the amount of water needed and also lowers the freezing point of the well treatment microemulsion. Among the salts that may be added are NaCl, KCl, $CaCl_2$, and MgCl. Others suitable salts can be formed from K, Na, Br, Cr, Cs and Bi metals.

The microemulsions may be prepared by subjecting the emulsifier(s), alcohol and optional components to high intensity shear at room temperature, typically for about 5 to 10 minutes. The blend of fatty acid ester and terpene is then added and shearing is continued. Water is then added, typically after about 5 to 10 minutes. The resulting microemulsion is typically colorless.

Furthermore, it will be understood that in some applications, it may be desirable to introduce the blend of fatty acid ester and terpene blend downhole where it will be combined with separately injected water and water-based materials, such as emulsifier(s) and alcohol, to form the microemulsion in situ.

In well remediation applications, the solvent system is preferably injected directly into the wellbore through the production tubing or through the use of coiled tubing or similar delivery mechanisms. Once downhole, the well treatment solvent system remedies damage caused during well treating such as, for instance, by stimulation fluids and drilling fluid muds, by dispersing and removing fines, paraffin and/or asphaltene deposits, sulfur, pipe dope and unwanted hydrocarbons, such as heavy oil tar by-products and water blocks, from the formation and wellbore.

The solvent system can further be used for hydrogen sulfide mitigation. In a preferred embodiment, the solvent system is injected into the wellbore so that escaping hydrogen sulfide gas is "stripped" through the system. Preferably, the solvent system is periodically injected into problem wells to mitigate hydrogen sulfide production. Alternatively, the solvent system may be injected downhole via capillary tubing on a continuous basis. In yet another alternate embodiment, the solvent system may be placed in a container that is placed in fluid communication with the hydrogen sulfide. The interaction between the solvent system and the hydrogen sulfide neutralizes the enhancement of oil recovery and is useful in hydrogen sulfide, leaving an inert sulfur compound as a product of the reaction. Some or all of the water in the solvent system may further be replaced with a known hydrogen sulfide scavenger. For example, many cyclic amines, such as triazines and hexamines, can be used in combination with water to further improve hydrogen sulfide mitigation.

The well treatment solvent system can also be used in stimulation operations. In fracturing operations, for example, proppant material can be added to the system before injection downhole. The well treatment solvent system can also be used to deliver acids during acidizing operations. Acids commonly used include hydrochloric, acetic, formic, and hydrochloric-hydrofluoric acids.

When a microemulsion is desired, the fatty acid ester and terpene blend and emulsifying agent and alcohol may be combined with an acidified carrier fluid to prepare a microemulsion suitable for acidizing operations. Such microemulsions include about 0.2%-15% by volume of the blend and about 3%-28% by volume of acid. In a particularly preferred embodiment, the microemulsion includes about 0.2%-15% of the blend and about 15% by volume of hydrochloric acid. The concentration of the well treatment microemulsion in gelled fluids lowers the friction created by contact with conduits, thereby facilitating the injection and withdrawal of the well treatment microemulsion.

The solvent system of this disclosure is useful in the enhancement of oil recovery and has applicability as a spearhead fluid and thus may be introduced prior to the introduction of a well treatment fluid. For instance, the solvent system is useful as a spearhead fluid to remove produced hydrocarbons prior to a water control treatment. This treatment further serves to prevent breakage or emulsification of the subsequently injected water control fluid due to mixing with the produced oil.

The system is further efficacious in the alleviation of water blocks, the removal of excess water and the lowering of pore pressure in the formation.

The solvent system used in this disclosure is suitable for the reduction of the viscosity of any well treating gelled fluid. For instance, the well treatment solvent system is useful as a breaker catalyst for highly viscous crosslinked gels to lower viscosity fluids by lowering the pH of the system. This occurs by the conversion of the lactic acid ester to lactic acid that, in turn, lowers the pH. The lowering of the pH serves to reduce the viscosity of the gelled fluid by reversing the crosslinking of the fracturing fluids. Desired materials, such as oil and gas, thereafter more easily flow into the wellbore.

In addition, where an enzyme breaker is used, the use of the solvent system of the disclosure causes a decrease in pH over time. As the pH is decreased, the enzymes are activated. Upon activation, the enzymes function to break the gel. Thus, the solvent system may be utilized to activate gel breakers, such as enzymes, to reduce the viscosity of a fracturing fluid or gelled solvent system.

In a preferred mode, the solvent system is used to displace the drilling fluid with the completion fluid by being pumped into the well prior to introduction of packer fluid, when used. The solvent system has particular applicability in the removal of synthetic based oil muds (SOBM) and oil based drilling muds (OBM) from the wellbore casing, tubing and downhole liners in light of its ability to more readily break down emulsifiers and other additives present in the mud. In a particularly preferred embodiment of the disclosure, the solvent system is a microemulsion used to remove OBM/SOBM drilling mud fluids. When used as a microemulsion, the emulsifier should be selected according to whether oil or water based drilling fluids is used.

The system is further effective at decreasing the density of filter cakes during high pressure injection of gelled fluids into the wellbore.

The solvent system may also be used for other applications such as to clean surface and downhole equipment.

Preferred embodiments of this disclosure are described in the clauses 1-53 below.

1. A method of treating an oil or gas well having a wellbore, well casing, production equipment or recovery equipment, said method comprising:
introducing into the wellbore, well casing, production equipment or recovery equipment a solvent blend;
wherein the blend comprises at least one $C_1$-$C_4$ ester of a $C_{16}$-$C_{20}$ fatty acid component, at least one terpene hydrocarbon component;
wherein the weight percent ratio of the at least one $C_1$-$C_4$ ester of a $C_{16}$-$C_{20}$ fatty acid component to the at least one terpene hydrocarbon component is from about 60:40 weight percent to about 95:5 weight percent, based on the total weight of the blend; and
wherein the blend has a flash point greater than about 140° F.

2. A method of treating an oil or gas well having a wellbore, well casing, production equipment or recovery equipment, said method comprising:
introducing into the wellbore, well casing, production equipment or recovery equipment a blend;
wherein the blend comprises a blend of at least one $C_1$-$C_4$ ester of a $C_{16}$-$C_{20}$ fatty acid component, at least one terpene hydrocarbon component, and at least one emulsifier component;
wherein the weight percent ratio of the at least one $C_1$-$C_4$ ester of a $C_{16}$-$C_{20}$ fatty acid component to the at least one terpene hydrocarbon component is from about 60:40 weight percent to about 95:5 weight percent, based on the total weight of the blend; and
wherein the blend has a flash point greater than about 140° F.

3. A method of removing pipe dope, hydrocarbons, drilling muds, hydrogen sulfide, scales, fines, sulfur, heaving oil byproducts, water blocks, cement filtrates, kill fluids, paraffins and/or asphaltenes from surface equipment or downhole equipment, said method comprising:
introducing onto the surface of the surface equipment or downhole equipment a solvent blend;
wherein the blend comprises at least one $C_1$-$C_4$ ester of a $C_{16}$-$C_{20}$ fatty acid component and at least one terpene hydrocarbon component;
wherein the weight percent ratio of the at least one $C_1$-$C_4$ ester of a $C_{16}$-$C_{20}$ fatty acid component to the at least one terpene hydrocarbon component is from about 60:40 weight percent to about 95:5 weight percent, based on the total weight of the blend; and
wherein the blend has a flash point greater than about 140° F.

4. A method of removing pipe dope, hydrocarbons, drilling muds, hydrogen sulfide, scales, fines, sulfur, heaving oil byproducts, water blocks, cement filtrates, kill fluids, paraffins and/or asphaltenes from surface equipment or downhole equipment, said method comprising:
introducing onto the surface of the surface equipment or downhole equipment a blend;
wherein the blend comprises a blend of at least one $C_1$-$C_4$ ester of a $C_{16}$-$C_{20}$ fatty acid component, at least one terpene hydrocarbon component, and at least one emulsifier component;
wherein the weight percent ratio of the at least one $C_1$-$C_4$ ester of a $C_{16}$-$C_{20}$ fatty acid component to the at least one terpene hydrocarbon component is from about 65:35 weight percent to about 95:5 weight percent, based on the total weight of the blend; and
wherein the blend has a flash point greater than about 140° F.

5. The method of clauses 1 and 3, wherein the blend further comprises an emulsifier.

6. The method of clauses 1-5, wherein the blend has a flash point greater than about 150° F.

7. The method of clauses 1-5, wherein the at least one $C_1$-$C_4$ ester of a $C_{16}$-$C_{20}$ fatty acid component comprises corn, mustard, niger seed, olive, peanut, poppy seed, rapeseed, safflower, sesame, soybean, sunflower seed, wheat germ, or mixtures thereof.

8. The method of clauses 1-5, wherein the at least one $C_1$-$C_4$ ester of a $C_{16}$-$C_{20}$ fatty acid component comprises a $C_{16}$-$C_{20}$ fatty acid methyl ester.

9. The method of clauses 1-5, wherein the at least one $C_1$-$C_4$ ester of a $C_{16}$-$C_{20}$ fatty acid component comprises a soybean methyl ester.

10. The method of clauses 1-5, wherein the at least one terpene hydrocarbon component comprises a pure gum turpentine, an oil of turpentine, or mixture thereof.

11. The method of clauses 1-5, wherein the at least one terpene hydrocarbon component comprises terpinolene, alpha-ocimene, beta-ocimene, alpha-terpinene, beta-terpinene, gamma-terpinene, sabinene, alpha-thujene, beta-thujene, camphene, carene, pinene, or mixture thereof.

12. The method of clauses 1-5, wherein the at least one terpene hydrocarbon component further comprises at least one terpenoid component.

13. The method of clauses 2, 4 and 5 wherein the emulsifier component is anionic, nonionic, amphoteric, or mixtures thereof.

14. The method of clauses 2, 4 and 5, wherein the emulsifier component is selected from the group consisting of polyoxyethylene sorbitan monopalmitate, polyoxyethylene sorbitan monostearate, polyoxyethylene sorbitan monooleate, linear alcohol alkoxylates, alkyl ether sulfates, linear nonyl-phenols, dioxane, ethylene glycol and ethoxylated castor oils such as polyethylene glycol castor oil, dipalmitoylphosphatidylcholine (DPPC), polyoxyethylene (8.6) nonyl phenyl ether, ethylene oxide sulfonates, alkyl propoxy-ethoxysulfate, alkylarylpropoxy-ethoxysulfonate and highly substituted benzene sulfonates.

15. The method of clauses 2, 4 and 5, wherein the emulsifier component is a linear polyoxyethylene alcohol having from about 13 to about 15 carbon atoms and comprising about 8 to about 12 moles ethylene oxide.

16. The method of clauses 1-5, wherein the blend further comprises a surfactant.

17. The method of clause 16, wherein the surfactant is selected from the group consisting of an ethoxylated plant oil based surfactant, a fatty alcohol ethoxylate, a fatty acid ethoxylate, a fatty acid amide ethoxylate, a fatty acid ester, a fatty acid methyl ester ethoxylate, an alkyl polyglucoside, a polyalcohol ethoxylate, a sorbitan ester, a soy alkyltrimethyl ammonium chloride, an ethoxylated coco fatty acid, an ethoxylated coco fatty ester, an ethoxylated cocoamide, an ethoxylated castor oil, and combinations thereof.

18. The method of clauses 1-5, wherein the weight percent ratio of the at least one $C_1$-$C_4$ ester of a $C_{16}$-$C_{20}$ fatty acid component to the at least one terpene hydrocarbon component is from about 60:40 weight percent to about 90:10 weight percent, based on the total weight of the blend.

19. The method of clauses 2, 4 and 5, wherein the emulsifier is present in the blend in an amount from about 0.01 to about 10 percent by weight, based on the total weight of the blend.

20. The method of clause 16, wherein the surfactant is present in the blend in an amount from about 0.01 to about 10 percent by weight, based on the total weight of the blend.

21. The method of clauses 1-5, which comprises introducing the blend into an oil or gas producing well penetrating a geological formation and stimulating the formation.

22. The method of clauses 1-5, wherein the blend further comprises a proppant.

23. The method of clauses 1-5, wherein, subsequent to introduction of the blend into the wellbore, well casing, production equipment or recovery equipment, unwanted deposits are removed therefrom.

24. The method of clause 23, wherein the unwanted deposits removed from the wellbore, well casing, production equipment or recovery equipment are selected from the group consisting of asphaltenes, hydrogen sulfide, paraffins, scales, fines, sulfur, heavy oil by-products, water blocks, drilling fluids, cement filtrates, kill fluids, pipe dope, hydrocarbon emulsions, oil based muds and/or synthetic oil based muds.

25. The method of clauses 1-5, wherein the blend is introduced into the wellbore, well casing, production equipment or recovery equipment through production or coiled tubing.

26. The method of clauses 1-5, wherein the blend is introduced into the wellbore, well casing, production equipment or recovery equipment and drilling muds are removed therefrom, and further wherein the drilling muds are removed prior to cementing of the wellbore or prior to introduction of a completion brine into the wellbore.

27. The method of clause 26, wherein the drilling muds are selected from the group consisting of oil based muds and synthetic oil based muds.

28. The method of clauses 1-5, wherein the blend is introduced into the wellbore, well casing, production equipment or recovery equipment which contains a well treating gelled fluid, and further wherein the blend, acting as a breaker catalyst, activates a gel breaker which is present in the wellbore, well casing, production equipment or recovery equipment, thereby reducing the viscosity of the well treating gelled fluid.

29. The method of clauses 1-5, wherein the blend is a displacement spacer or a spearhead fluid.

30. The method of clauses 2, 4 and 5, wherein the blend forms a microemulsion upon mixing with water.

31. A composition comprising:
a blend of at least one $C_1$-$C_4$ ester of a $C_{16}$-$C_{20}$ fatty acid component, and at least one terpene hydrocarbon component;
wherein the weight percent ratio of the at least one $C_1$-$C_4$ ester of a $C_{16}$-$C_{20}$ fatty acid component to the at least one terpene hydrocarbon component is from about 60:40 weight percent to about 95:5 weight percent, based on the total weight of the composition; and
wherein the composition has a flash point greater than about 140° F.

32. A composition comprising:
a blend of at least one $C_1$-$C_4$ ester of a $C_{16}$-$C_{20}$ fatty acid component, at least one terpene hydrocarbon component, and at least one emulsifier component;
wherein the weight percent ratio of the at least one $C_1$-$C_4$ ester of a $C_{16}$-$C_{20}$ fatty acid component to the at least one terpene hydrocarbon component is from about 60:40 weight percent to about 95:5 weight percent, based on the total weight of the composition; and
wherein the composition has a flash point greater than about 140° F.

33. A composition for treating an oil or gas well having a wellbore, well casing, production equipment or recovery equipment, said composition comprising:
a blend of at least one $C_1$-$C_4$ ester of a $C_{16}$-$C_{20}$ fatty acid component, and at least one terpene hydrocarbon component;
wherein the weight percent ratio of the at least one $C_1$-$C_4$ ester of a $C_{16}$-$C_{20}$ fatty acid component to the at least one terpene hydrocarbon component is from about 60:40 weight percent to about 95:5 weight percent, based on the total weight of the composition; and
wherein the composition has a flash point greater than about 140° F.

34. A composition for treating an oil or gas well having a wellbore, well casing, production equipment or recovery equipment, said composition comprising:
a blend of at least one $C_1$-$C_4$ ester of a $C_{16}$-$C_{20}$ fatty acid component, at least one terpene hydrocarbon component, and at least one emulsifier component;
wherein the weight percent ratio of the at least one $C_1$-$C_4$ ester of a $C_{16}$-$C_{20}$ fatty acid component to the at least one terpene hydrocarbon component is from about 60:40 weight percent to about 95:5 weight percent, based on the total weight of the composition; and
wherein the composition has a flash point greater than about 140° F.

35. A composition for removing pipe dope, hydrocarbons, drilling muds, hydrogen sulfide, scales, fines, sulfur, heaving oil byproducts, water blocks, cement filtrates, kill fluids, paraffins and/or asphaltenes from surface equipment or downhole equipment, said composition comprising:
a blend of at least one $C_1$-$C_4$ ester of a $C_{16}$-$C_{20}$ fatty acid component, and at least one terpene hydrocarbon component;
wherein the weight percent ratio of the at least one $C_1$-$C_4$ ester of a $C_{16}$-$C_{20}$ fatty acid component to the at least one terpene hydrocarbon component is from about 65:35 weight percent to about 95:5 weight percent, based on the total weight of the composition; and wherein the composition has a flash point greater than about 140° F.

36. A composition removing pipe dope, hydrocarbons, drilling muds, hydrogen sulfide, scales, fines, sulfur, heaving oil byproducts, water blocks, cement filtrates, kill fluids, paraffins and/or asphaltenes from surface equipment or downhole equipment, said composition comprising:

a blend of at least one $C_1$-$C_4$ ester of a $C_{16}$-$C_{20}$ fatty acid component, at least one terpene hydrocarbon component, and at least one emulsifier component;

wherein the weight percent ratio of the at least one $C_1$-$C_4$ ester of a $C_{16}$-$C_{20}$ fatty acid component to the at least one terpene hydrocarbon component is from about 65:35 weight percent to about 95:5 weight percent, based on the total weight of the composition; and wherein the composition has a flash point greater than about 140° F.

37. The composition of clauses 31, 33 and 35, further comprising an emulsifier component.

38. The composition of clauses 31-37, which has a flash point greater than about 150° F.

39. The composition of clauses 31-37, wherein the at least one $C_1$-$C_4$ ester of a $C_{16}$-$C_{20}$ fatty acid component comprises corn, mustard, niger seed, olive, peanut, poppy seed, rapeseed, safflower, sesame, soybean, sunflower seed, wheat germ, or mixtures thereof.

40. The composition of clauses 31-37, wherein the at least one $C_1$-$C_4$ ester of a $C_{16}$-$C_{20}$ fatty acid component comprises a $C_{16}$-$C_{20}$ fatty acid methyl ester.

41. The composition of clauses 31-37, wherein the at least one $C_1$-$C_4$ ester of a $C_{16}$-$C_{20}$ fatty acid component comprises a soybean methyl ester.

42. The composition of clauses 31-37, wherein the at least one terpene hydrocarbon component comprises a pure gum turpentine, an oil of turpentine, or mixture thereof.

43. The composition of clauses 31-37, wherein the at least one terpene hydrocarbon component comprises terpinolene, alpha-ocimene, beta-ocimene, alpha-terpinene, beta-terpinene, gamma-terpinene, sabinene, alpha-thujene, beta-thujene, camphene, carene, pinene, or mixture thereof.

44. The composition of clauses 31-37, wherein the at least one terpene hydrocarbon component further comprises at least one terpenoid component.

45. The composition of clauses 31-37, further comprising a surfactant component.

46. The composition of clause 45, wherein the surfactant component is selected from the group consisting of an ethoxylated plant oil based surfactant, a fatty alcohol ethoxylate, a fatty acid ethoxylate, a fatty acid amide ethoxylate, a fatty acid ester, a fatty acid methyl ester ethoxylate, an alkyl polyglucoside, a polyalcohol ethoxylate, a sorbitan ester, a soy alkyltrimethyl ammonium chloride, an ethoxylated coco fatty acid, an ethoxylated coco fatty ester, an ethoxylated cocoamide, an ethoxylated castor oil, and combinations thereof.

47. The composition of clauses 31-37, wherein the weight percent ratio of the at least one $C_1$-$C_4$ ester of a $C_{16}$-$C_{20}$ fatty acid component to the at least one terpene hydrocarbon component is from about 65:35 weight percent to about 90:10 weight percent, based on the total weight of the composition.

48. The composition of clauses 32, 34, 36 and 37 wherein the emulsifier is present in the composition in an amount from about 0.01 to about 10 percent by weight, based on the total weight of the composition.

49. The composition of clause 45, wherein the surfactant is present in the composition in an amount from about 0.01 to about 10 percent by weight, based on the total weight of the composition.

50. The composition of clauses 32, 34, 36 and 37] which forms a microemulsion upon mixing with water.

51. The composition of clauses 32, 34, 36 and 37, wherein the emulsifier component is anionic, nonionic, amphoteric, or mixtures thereof.

52. The composition of clauses 32, 34, 36 and 37, wherein the emulsifier component is selected from the group consisting of polyoxyethylene sorbitan monopalmitate, polyoxyethylene sorbitan monostearate, polyoxyethylene sorbitan monooleate, linear alcohol alkoxylates, alkyl ether sulfates, linear nonyl-phenols, dioxane, ethylene glycol and ethoxylated castor oils such as polyethylene glycol castor oil, dipalmitoylphosphatidylcholine (DPPC), polyoxyethylene (8.6) nonyl phenyl ether, ethylene oxide sulfonates, alkyl propoxy-ethoxysulfate, alkylarylpropoxy-ethoxysulfonate and highly substituted benzene sulfonates.

53. The composition of clauses 32, 34, 36 and 37, wherein the emulsifier component is a linear polyoxyethylene alcohol having from about 13 to about 15 carbon atoms and comprising about 8 to about 12 moles ethylene oxide.

The terms "comprises" or "comprising" are interpreted as specifying the presence of the stated features, integers, steps or components, but not precluding the presence of one or more other features, integers, steps or components or groups thereof.

It should be understood that various alternatives, combinations and modifications of the present disclosure could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The following examples are provided to offer additional description of the compositions and methods disclosed and claimed in this patent. These are exemplary only, and are not intended to limit the disclosure in any aspect. All proportions and percentages set out herein are by weight unless the contrary is stated.

What is claimed is:

1. A method of treating an oil or gas well having a wellbore, well casing, production equipment or recovery equipment, the method comprising:

introducing into the wellbore, well casing, production equipment or recovery equipment a composition comprising a solvent blend;

wherein the blend comprises at least one $C_1$-$C_4$ ester of a $C_{16}$-$C_{20}$ fatty acid component, and at least one terpene hydrocarbon component;

wherein the weight percent ratio of the at least one $C_1$-$C_4$ ester of a $C_{16}$-$C_{20}$ fatty acid component to the at least one terpene hydrocarbon component is from about 60:40 weight percent to about 95:5 weight percent, based on the total weight of the blend;

wherein the blend is present in an amount from about 10 to about 50 weight percent, based on the total weight of the composition;

wherein the composition has a flash point greater than about 140° F.; and adding an acid in an amount so that the pH of the composition is about 4 or less.

2. The method of claim 1, wherein the composition further comprises an emulsifier.

3. The method of claim 2, wherein the emulsifier component is selected from the group consisting of anionic, nonionic, amphoteric, and any mixtures thereof.

4. The method of claim 2, wherein the emulsifier component is selected from the group consisting of polyoxyethylene sorbitan monopalmitate, polyoxyethylene sorbitan monostearate, polyoxyethylene sorbitan monooleate, linear alcohol alkoxylates, alkyl ether sulfates, linear nonyl-phenols, dioxane, ethylene glycol, ethoxylated castor oils, polyethylene glycol castor oil, dipalmitoylphosphatidylcholine (DPPC), polyoxyethylene (8.6) nonyl phenyl ether, ethylene oxide sulfonates, alkyl propoxy-ethoxysulfate, alkylaryl-propoxy-ethoxysulfonate, and highly substituted benzene sulfonates.

5. The method of claim 2, wherein the emulsifier component is a linear polyoxyethylene alcohol having from about 13 to about 15 carbon atoms and comprising about 8 to about 12 moles ethylene oxide.

6. The method of claim 2, wherein the emulsifier is present in the composition in an amount from about 0.01 to about 10 percent by weight, based on the total weight of the composition.

7. The method of claim 1, wherein the composition has a flash point greater than about 150° F.

8. The method of claim 1, wherein the at least one $C_1$-$C_4$ ester of a $C_{16}$-$C_{20}$ fatty acid component is selected from the group consisting of corn, mustard, niger seed, olive, peanut, poppy seed, rapeseed, safflower, sesame, soybean, sunflower seed, wheat germ, and mixtures thereof.

9. The method of claim 1, wherein the at least one $C_1$-$C_4$ ester of a $C_{16}$-$C_{20}$ fatty acid component comprises a $C_{16}$-$C_{20}$ fatty acid methyl ester, or a soybean methyl ester.

10. The method of claim 1, wherein the at least one terpene hydrocarbon component comprises a pure gum turpentine, an oil of turpentine, or mixture thereof.

11. The method of claim 1, wherein the at least one terpene hydrocarbon component is selected from the group consisting of terpinolene, alpha-ocimene, beta-ocimene, alpha-terpinene, beta-terpinene, gamma-terpinene, sabinene, alpha-thujene, beta-thujene, camphene, carene, pinene, and any mixtures thereof.

12. The method of claim 1, wherein the at least one terpene hydrocarbon component further comprises at least one terpenoid component.

13. The method of claim 1, wherein the composition further comprises a surfactant.

14. The method of claim 13, wherein the surfactant is selected from the group consisting of an ethoxylated plant oil based surfactant, a fatty alcohol ethoxylate, a fatty acid ethoxylate, a fatty acid amide ethoxylate, a fatty acid ester, a fatty acid methyl ester ethoxylate, an alkyl polyglucoside, a polyalcohol ethoxylate, a sorbitan ester, a soy alkyltrimethyl ammonium chloride, an ethoxylated coco fatty acid, an ethoxylated coco fatty ester, an ethoxylated cocoamide, an ethoxylated castor oil, and combinations thereof.

15. The method of claim 13, wherein the surfactant is present in the composition in an amount from about 0.01 to about 10 percent by weight, based on the total weight of the composition.

16. The method of claim 1, wherein the weight percent ratio of the at least one $C_1$-$C_4$ ester of a $C_{16}$-$C_{20}$ fatty acid component to the at least one terpene hydrocarbon component is from about 60:40 weight percent to about 90:10 weight percent, based on the total weight of the blend.

17. The method of claim 1, which comprises introducing the composition into an oil or gas producing well penetrating a geological formation and stimulating the formation.

18. The method of claim 1, wherein the composition further comprises a proppant.

19. The method of claim 1, wherein, subsequent to introduction of the composition into the wellbore, well casing, production equipment or recovery equipment, unwanted deposits are removed therefrom; wherein the unwanted deposits are selected from the group consisting of asphaltenes, hydrogen sulfide, paraffins, scales, fines, sulfur, heavy oil by-products, water blocks, drilling fluids, cement filtrates, kill fluids, pipe dope, hydrocarbon emulsions, oil based muds and/or synthetic oil based muds.

20. The method of claim 1, wherein the composition is introduced into the wellbore, well casing, production equipment or recovery equipment through production or coiled tubing; or wherein the composition is introduced into the wellbore, well casing, production equipment or recovery equipment and drilling muds are removed therefrom, and further wherein the drilling muds are removed prior to cementing of the wellbore or prior to introduction of a completion brine into the wellbore; wherein the drilling muds are selected from the group consisting of oil based muds and synthetic oil based muds; or wherein the composition is introduced into the wellbore, well casing, production equipment or recovery equipment which contains a well treating gelled fluid, and further wherein the composition, acting as a breaker catalyst, activates a gel breaker which is present in the wellbore, well casing, production equipment or recovery equipment, thereby reducing the viscosity of the well treating gelled fluid.

21. The method of claim 1, wherein the composition is a displacement spacer or a spearhead fluid.

22. The method of claim 1, wherein the acid is selected from the group consisting of phosphoric acid, hydrochloric acid, sulfuric acid, and nitric acid.

23. The method of claim 1, wherein the composition forms a microemulsion upon mixing with water.

* * * * *